United States Patent [19]

Schrepfer

[11] Patent Number: 4,858,865

[45] Date of Patent: Aug. 22, 1989

[54] WEDGE LEVELING MOUNTING DEVICE

[75] Inventor: Rudolf Schrepfer, Kuesnacht, Switzerland

[73] Assignee: Air-Loc Schrepfer AG, Kusnacht, Switzerland

[21] Appl. No.: 110,337

[22] Filed: Oct. 20, 1987

[51] Int. Cl.⁴ ............................................. F16M 11/24
[52] U.S. Cl. .................................. 248/188.2; 248/638
[58] Field of Search ............ 248/638, 544, 669, 188.2, 248/188.3, 188.4, 575, 630, 637, 678, 676, 668, 639, 507; 411/17, 18, 24–26, 77

[56] References Cited

U.S. PATENT DOCUMENTS

| 3,495,896 | 2/1970 | Barcus et al. ................... 248/477 X |
| 4,114,845 | 9/1978 | Weisenberger ............. 248/188.2 X |
| 4,436,268 | 3/1984 | Schrievier .................... 248/188.2 X |

FOREIGN PATENT DOCUMENTS

| 1297409 | 6/1969 | Fed. Rep. of Germany . |
| 1806424 | 1/1970 | Fed. Rep. of Germany ...... 248/507 |
| 3012986 | 10/1981 | Fed. Rep. of Germany ...... 248/544 |

Primary Examiner—Alvin C. Chin-Shue
Attorney, Agent, or Firm—Charles E. Pfund

[57] ABSTRACT

A wedge operated levelling shoe is disclosed for supporting machine tools or the like. A top and bottom plate are separated by an adjustable distance determined by the position of an intermediate wedge. The parts are maintained aligned by slidable keys and resilient spring elements which provide a compact unit with higher natural resonant frequency than the individual parts.

8 Claims, 2 Drawing Sheets

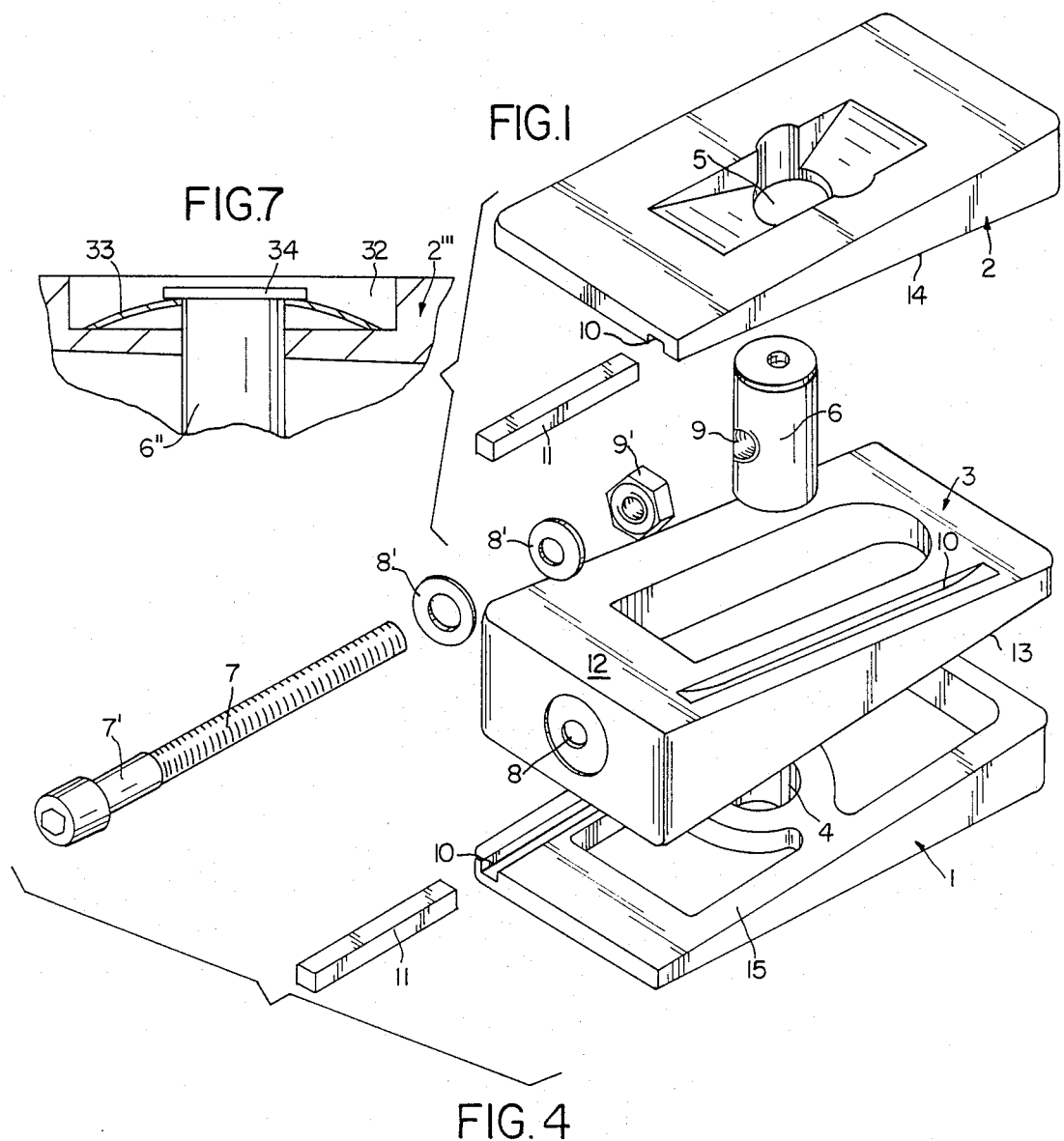
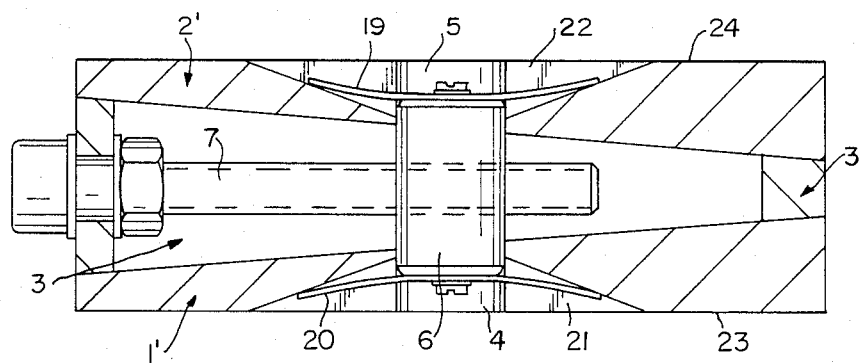

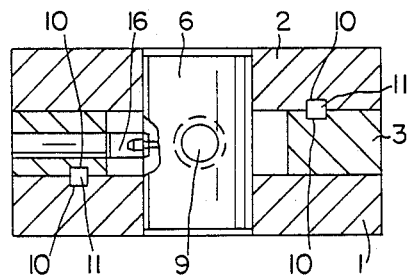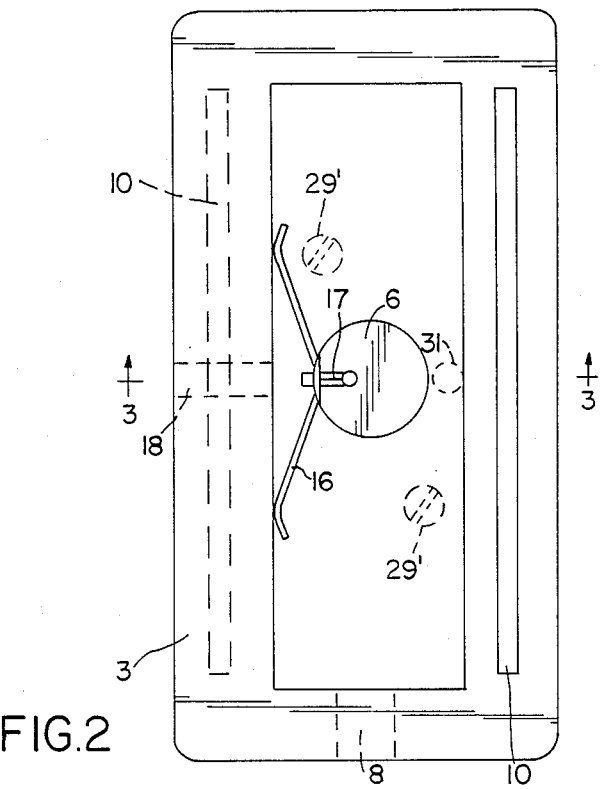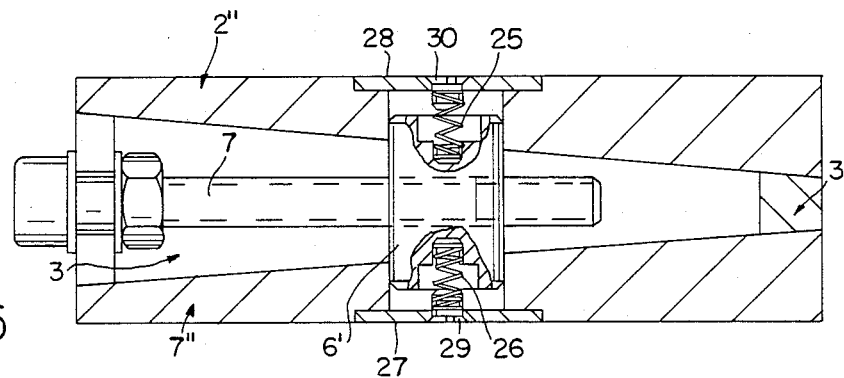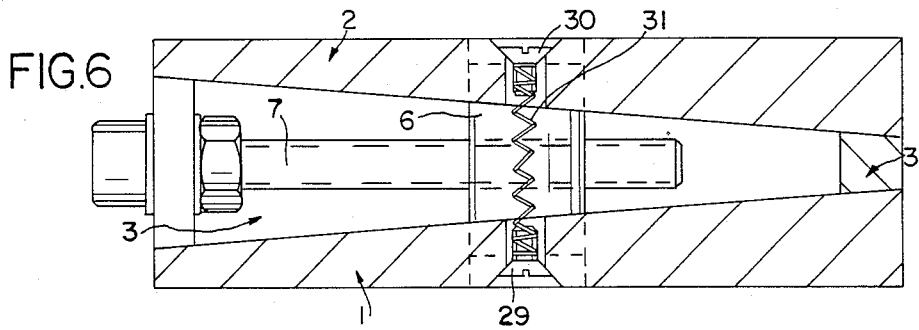

WEDGE LEVELING MOUNTING DEVICE

BACKGROUND OF THE INVENTION

This invention relates to leveling devices or "shoes" for supporting heavy equipment such as machine tools or the like in which a horizontally slidable wedge provides for adjustment of the vertical spacing between an upper and lower support plate.

Devices of this type are in widespread use and shown, for example, in Patent DE-PS 1,297,409. Such devices consist of several parts which are stacked on each other to form a unit. The contact area between wedge and headplate as well as between wedge and footplate, is maintained in alignment by sliding keys in keyway slots. The keys serve also to prevent relative the sideward between the parts.

The machines and plant equipment which are mounted on such devices produce, during operation, various types of vibrations which are transferred to the mount. In order to absorb these vibrations it has been proposed to equip the area of the foot and headplate with vibration dampening material. A mount equipped with this material cannot give satisfactory results since it not only serves as an elastic bearing but also precludes precision levelling of the machines resting on it.

The present invention ensures that the dangerous resonance zone vibrations can be controlled. This result is attained by changing the natural frequency of the mounts. In the present invention consideration has been given to the natural frequency of the parts. Since all these parts are manufactured with certain tolerances resulting from the production process and are loosely connected to each other whereby the moving parts in particular have certain clearances, this construction gives a different natural frequency to each part. When operating the machine which is lying on the mount the natural frequency of the single parts is often approached or exceeded meaning that certain parts of the mount are reaching the resonance zone. This is a disadvantage for the moving and guiding areas of the various parts as well as for the precision levelling for the machine supported by the mount. The object of the present invention is to manufacture a mount as described with which these disadvantages can be eliminated. This is achieved in the new leveling mount which features pre-tensioned spring elements between the various mount parts to ensure a spring elastic constant compactness and vibration resonance control.

The aforementioned new mount will be described in more detail in the various views shown in the drawings:

FIG. 1 is an isometric view showing the major elements of the mount except for the resilient spring means;

FIG. 2 is a top plan view of the wedge in FIG. 1 showing a transverse leaf spring in place;

FIG. 3 is a sectional view on line 3—3 of FIG. 2 through the assembled mount;

FIG. 4 is a longitude sectional view of a modification showing one form of vertical spring tensioning of the elements;

FIG. 5 is a view similar to FIG. 4 of a modification;

FIG. 6 is a view similar to FIG. 4 of another modification; and

FIG. 7 is a fragmentary sectional view of a modification having a compression spring.

The embodiment shown in FIG. 1 has a footplate 1 with a top inclined surface, a headplate 2 with a bottom inclined surface and a wedge 3 lying inbetween. Foot and headplates 1, 2 respectively are provided with openings 4 and 5 to receive a cylindrical pin 6. Both plates 1 and 2 can be vertically moved on this pin 6. The headplate 2 is consequently vertically guided in relation to footplate 1.

The wedge 3 has a clearance hole 8 through which passes a threaded lead screw 7. The screw 7 passes through the opening 8 and is screwed into a threaded hole 9 of pin 6. The screw 7 has a smooth section 7' which is rotatably retained within smooth bore hole 8 by washers 8' and a threaded nut 9'. In this way wedge 3 is movable horizontally relative to the plates 1 and 2 by rotating the screw 7.

The footplate 1, the headplate 2 and the wedge 3 are provided with longitudinal channels 10 which are parallel to the screw 7. Guide keys 11 lie in the channels 10. The wedge 3 has smooth inclined surfaces 12 and 13 which will slide on surfaces 14 and 15 respectively of headplate 2 and the footplate 1. The guide keys 11 allow moving of the wedge 3 in the direction of the spindle 7 whereby plates 1 and 2 remain in place but at adjustable vertical spacing. The guide keys 11 ensure that the wedge is not moving sidewards and the three parts 1, 2 and 3 are fixed transversely relative to the screw 7. Both guide keys 11 are accommodated in the respective channels 10. Certain production tolerances have to be accepted for economic reasons with the keys and channels, consequently some clearance is inevitable.

The mounts contain horizontal and vertical spring elements acting on the relatively moving parts. According to the embodiment shown in FIG. 2 a leaf spring element 16 lies between the pin 6 and the wedge 3. The spring element 16 is bowed to rest on one side at the pin 6 and on the ends at inner surface of the wedge 3. In FIG. 2 the wedge 3 is urged horizontally relative the pin 6. Since pin 6 is retained in the holes 4 and 5 of the plates 1 and 2, the three parts 1, 2 and 3 will be horizontally urged at a right angle to screw 7. In this way the sides of the guide keys 11 will be spring elastically held in the sides of channels 10.

The pre-tension of the spring element 16 can be changed in two ways. In the case as shown in FIG. 2, the position of the spring element 16 can be changed by turning the screw 17 which is fixed to spring 16 and threaded into pin 6. The fixed holding point of the spring element 16 at the side of pin 6 can therefore be adjusted. Wedge 3 has a hole 18 in order to reach the adjusting screw 17. In this way changing the pre-tension of the spring element 16 is achieved by changing the position of the holding point. The pre-tension of the spring element 16 can also be attained by exchanging the spring element with one having different characteristics.

FIG. 4 shows one embodiment for holding the parts of the mount vertically against each other with tensioned spring elements. The same parts are identically marked as in FIG. 1. For example, FIG. 4 shows two leaf springs, 19, 20 which are attached to opposite ends of pin 6. The outer ends of leaf springs 19, 20 press against the head and footplates 1 and 2 respectively. In the embodiment of FIG. 4 the two plates 1 and 2 have recesses 21 and 22 with sloping surfaces against which the spring elements bear. Due to these provisions the pin 6 and springs 19, 20 do not stand out from the base area 23 of the footplate 1' and the top area 24 of the headplate 2'. It is because of these spring elements 19 and 20 that the parts 1', 2' and 3 are vertically and spring elastically kept together as a compact unit. The spring combination of FIG. 4 and FIG. 2 ensures that all parts of the mount will be vertically as well as horizontally held together.

FIG. 5 shows a different modification for vertically spring loading parts. Spring elements 25 and 26 act to apply a spring tension on one end at the pin 6 and on the other end by screws 29, 30 inserted in plates 27, 28 respectively of the foot and headplate 1, 2 respectively. Plates 27, 28 are equipped with flat head screws 29, 30 which are screwed into the springs 25, 26 of which the windings can accommodate the thread of the screw. The turning of the screws 29, 30 means that the effective lengths of the springs 25, 26 are changed and consequently the pre-tension of the spring elements 25, 26. The other ends of the springs 25, 26 are screwed into a threaded hole which is located axially in pin 6.

FIG. 6 shows an example containing only one spring element 31 which acts to apply spring tension. The screw spring 31 rests on one end at the footplate 1 and on the other end at headplate 2. Both flat head screws 29 and 30 are used again. The turning of the screws 29, 30 into the windings of the spring 31 changes the effective length of the spring 31. However, the spring 31, in comparison to the springs 25, 26 of FIG. 5, is not located in the center of pin 6, but alongside as indicated in FIG. 2. Another possibility would be to have two spring elements 31 placed in different areas in the same way with flat head screws 29' as indicated in FIG. 2. (This sample is not shown in a vertical cut away view). Particularly when the mount is of a large size, it is recommended to have several vertical spring elements such as 31.

In all cases described to this point, the spring elements have acted as tension springs. FIG. 7 shows how a vertically acting spring element can also act as a pressure spring. The headplate 2''' contains a recess 32 in which the inverted leafspring 33 rests. The leafspring 33 is held by a head 34 on the pin 6. The head 34 is for mounting purposes added as an independent part from pin 6.

Due to the spring elastic holding of the single parts of the mount the spring elastic compactness is ensured. If disturbing frequencies appear one does not have to take into consideration any longer the relatively low natural frequency of all the single parts which otherwise are loosely connected to each other. The spring elastic compactness of the mount has a different and higher natural frequency and therefore takes care of the undesirable bouncing vibrations which are produced by machinery standing on prevoiusly known mounts when passing through the natural frequency. These bouncing vibrations between the single parts of the prior art mounts have adverse effects on the parts (enlargement of clearances) and as a consequence precision levelling was hardly possible.

The new natural frequency of this compact mount can furthermore be altered by changing the pre-tension of the spring elements. The pre-tension will always be adjusted according to the type of the machine and its function. With the possibility of changing the pre-tension of the spring elements all relative motion due to production related inaccuracies can be eliminated and fine tolerances in the bearing area can be reached. Such precision can otherwise only be reached with extremely expensive production methods. This new compact mount has from a static point of view the advantage that it can easily be stored and transported, i.e., the single parts are mechanically held together and do not fall apart.

In the prior art mounts the falling apart of the single parts during transport, storage and premounting resulted often in extra costs and incorrect mounting resulting in operating problems of the machinery. Since this new compact mount has a higher natural frequency it offers another great advantage: It is very suitable for machine installations on elevated floors because its natural frequency can be adjusted to a level which is higher than the natural frequency of the floor, therefore the danger of resonance is eliminated.

I claim:

1. A levelling mount for machines and the like having a footplate with an upper inclined surface, a headplate with a lower inclined surface, a wedge interposed between said headplate and said footplate, said wedge having opposed inclined surfaces in sliding engagement respectively with said upper inclined surface and said lower inclined surface, a vertical pin passing through an opening in said wedge and plates and vertically aligning said plates for sliding vertical motion on said pin as said wedge moves horizontally therebetween, sliding key and slot means between said inclined surfaces for maintaining said plates and wedges in transverse alignment as said wedge moves, a threaded adjusting screw rotatably fixed in an end of said wedge and in threaded engagement with said vertical pin for horizontal adjustment of the position of said wedge between said plates upon rotation of said screw; and spring means for urging said wedge and plates into horizontal and vertical sliding engagement, said spring means, said vertical pin and said threaded screw acting to retain the parts in assembled operative relation.

2. The mount according to claim 1 wherein said spring means includes a leaf spring mounted on the side of said pin and bearing against said wedge to urge said wedge and plates in a horizontal direction.

3. The mount according to claims 1 or 2 wherein said spring means includes at least one spring attached to an end of said pin and urging said plates vertically into sliding contact with said wedge.

4. The mount according to claim 1 and including means for adjusting the spring force applied by said spring means.

5. The mount according to claims 1 or 2 wherein said spring means comprise leaf springs respectively attached to opposite ends of said pin with the ends of each leaf spring bearing with spring tension against recessed top and bottom surfaces, respectively, of said plates.

6. The mount according to claims 1 or 2 wherein said spring means comprises at least one helical spring and a screw thread engaged with said helical spring passing axially through said pin for applying tension spring force to hold said plates against said wedge.

7. The mount according to claim 2 wherein said leaf spring is adjustably mounted relative to the side of said pin for adjusting the spring force applied against said wedge.

8. The mount according to claim 1 and including means for selecting the characteristic of said spring means to obtain a desired spring loading between said plates and wedge.

* * * * *